United States Patent [19]

Wang et al.

[11] Patent Number: 4,785,061
[45] Date of Patent: Nov. 15, 1988

[54] METHOD FOR REDUCING THE ALIPHATIC HALIDE CONTENT OF EPOXY RESINS USING A SOLVENT MIXTURE INCLUDING A POLAR APROTIC SOLVENT

[75] Inventors: Chun S. Wang; Zeng-Kun Liao, both of Lake Jackson, Tex.

[73] Assignee: The Dow Chemical Company, Midland, Mich.

[21] Appl. No.: 85,046

[22] Filed: Aug. 13, 1987

[51] Int. Cl.$^4$ .............................................. C08G 59/14
[52] U.S. Cl. ..................................... 525/507; 549/514; 549/541; 528/487; 528/488; 528/489; 528/493; 528/497; 528/492
[58] Field of Search ................ 525/507; 549/514, 541; 528/487, 488, 489

[56] References Cited

U.S. PATENT DOCUMENTS

| | | | |
|---|---|---|---|
| 2,848,435 | 8/1958 | Griffin et al. | 528/95 |
| 3,121,727 | 2/1964 | Baliker, Jr. et al. | 549/517 |
| 3,145,191 | 8/1964 | Perfetti | 528/95 |
| 3,766,221 | 10/1973 | Becker | 549/517 |
| 4,132,718 | 1/1979 | Vargiu et al. | 528/95 |
| 4,447,598 | 5/1984 | Caskey et al. | 528/489 |
| 4,499,255 | 2/1985 | Wang et al. | 528/95 |
| 4,585,838 | 4/1986 | Wang et al. | 525/507 |
| 4,624,975 | 11/1986 | Pham | 523/453 |
| 4,684,701 | 8/1987 | Wang et al. | 528/95 |

FOREIGN PATENT DOCUMENTS 952357 3/1964 United Kingdom .
2120659B 12/1983 United Kingdom .

*Primary Examiner*—John Kight
*Assistant Examiner*—Frederick Krass

[57] ABSTRACT

The total halide content of epoxy resins is reduced by heating a resin containing undesirable halide dissolved in a solvent mixture containing at least one polar aprotic solvent in the presence of an alkali metal hydroxide for a time sufficient to reduce the total halide content.

16 Claims, No Drawings

METHOD FOR REDUCING THE ALIPHATIC HALIDE CONTENT OF EPOXY RESINS USING A SOLVENT MIXTURE INCLUDING A POLAR APROTIC SOLVENT

FIELD OF THE INVENTION

The present invention pertains to a method for reducing the hydrolyzable and bound (total) aliphatic halide content of an epoxy resin.

BACKGROUND OF THE INVENTION

Epoxy resins are used in the electronics industry as encapsulants, potting compounds, electrical laminates and the like. This industry has discovered that the halide content of the epoxy resin adversely affects the electrical properties of the resultant end products. The higher the halide content, the greater the detriment. There is a need for reducing the total (hydrolyzable and bound) halide content of epoxy resins.

SUMMARY OF THE INVENTION

The present invention pertains to an improvement in a method for reducing the total halide content of an epoxy resin containing hydrolyzable halide and/or bound halide which method comprises heating said epoxy resin which has been dissolved in a solvent system containing a ketone, an aromatic hydrocarbon, or any combination thereof in the presence of from about 0.25 to about 10 moles of a basic-acting compound per equivalent of total halide at a temperature and for a time sufficient to reduce the total halide content of said epoxy resin and thereafter recovering the resultant epoxy resin; wherein the improvement resides in employing as an additional solvent a polar aprotic solvent in an amount of from about 2 to about 80 percent by weight of the total amount of solvent employed.

Another aspect of the present invention is a process for reducing the total halide content of an epoxy resin containing hydrolyzable and/or bound halide which process comprises (A) dissolving said epoxy resin in a solvent system which comprises
 (1) from about 2 to about 80 percent by weight of at least one polar aprotic solvent;
 (2) from about 20 to about 98 percent by weight of a ketone, an aromatic hydrocarbon, or any combination thereof;

(B) heating the resultant solution to a temperature of from about 50° C. up to about 150° C.;

(C) adding from about 0.25 to about 10, moles of an alkali metal hydroxide, carbonate, bicarbonate, phosphate or any combination thereof per equivalent of total halide;

(D) continuing the heating for a time sufficient to reduce the total halide content of said epoxy resin;

(E) washing the product from step (D) with either water, a dilute aqueous solution of a weak inorganic acid, acid salt or a combination thereof; and (F) recovering the resultant epoxy resin having a reduced total halide content from the product of step (E).

The present invention provides a method for reducing the total (hydrolyzable and bound) halide content of epoxy resins.

DETAILED DESCRIPTION OF THE PRESENT INVENTION

Hydrolyzable halide is defined herein as any combination of halogen and hydroxyl groups on adjacent aliphatic carbon atoms, such as that illustrated by the following structure with chlorine being illustrated as the halogen.

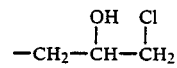

Bound halide is defined herein as any aliphatic halides not adjacent to a hydroxyl group, such as that illustrated by the following structures with chlorine being illustrated as the halogen.

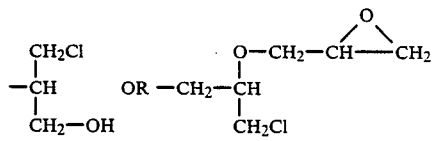

Total halide is defined herein as hydrolyzable halide plus bound halide.

Suitable epoxy resins which can be employed herein include any epoxy resin containing an average of more than one vicinal epoxy group per molecule and which contains an undesirable quantity of total, hydrolyzable and/or bound halide.

Particularly suitable epoxy resins include the polyglycidyl ethers of compounds having an average of more than one hydroxyl group per molecule and which contains at least about 10 parts per million total halide such as, for example, glycidyl ethers of bisphenols, glycidyl ethers of phenol-formaldehyde resins, glycidyl ethers of cresol-formaldehyde resins, mixtures thereof and the like. Particularly suitable epoxy resins are disclosed by Wang et al. in U.S. Pat. No. 4,499,255 which is incorporated herein by reference.

The solvent system, i.e., the total amount of solvent employed herein is that which provides from about 25 to about 500, suitably from about 50 to about 250, more suitably from about 75 to about 200, and most suitably from about 100 to about 150, percent by weight of total solvent based upon the weight of the epoxy resin being treated.

The solvent system employed herein contains a polar aprotic solvent and at least one other solvent such as, for example a ketone, an aromatic hydrocarbon, or a combination thereof. Usually, the solvent system employed herein contains from about 20 to about 49, suitably from about 30 to about 48, more suitably from about 35 to about 47, most suitably from about 40 to about 46 percent by weight of ketone; from about 20 to about 49, suitably from about 30 to about 48, more suitably from about 35 to about 47, most suitably from about 40 to about 46 percent by weight of aromatic hydrocarbon; and from about 2 to about 80 suitably from about 4 to about 40, more suitably from about 6 to about 20, most suitably from about 8 to about 10 percent by weight of polar aprotic solvent. The percentages are based upon the combined weight of the solvents employed.

Suitable polar aprotic solents which can be employed herein include, for example, dimethyl sulfoxide, dimethyl acetamide, N-methylpyrrolidinone, dimethyl formamide, dimethylsulfone, tetramethyl urea, hexamethyl phosphoramide, tetramethylenesulfone, 1,4-dioxane, 1,2-dimethoxy ethane, 1,2-diethoxy ethane, 1,2-dimethoxy propane, combinations thereof and the like. Any such solvent can be employed so long as it does not react with the components of the reaction mixture.

The other solvent(s) employed in addition to the polar aprotic solvent can include such solvents as ketones, aromatic hydrocarbons, and/or aliphatic hydrocarbons having from 6 to about 12 carbon atoms, combinations thereof and the like. Any such solvent can be employed so long as it does not react with the components of the reaction mixture. Particularly suitable such solvents include, acetone, methyl ethyl ketone, methyl isobutyl ketone, toluene, xylene, any combination thereof and the like.

Suitable alkali metal basic-acting compounds include the alikali metal hydroxides, carbonates, bicarbonates, phosphates or any combination thereof. Particularly suitable basic-acting compounds include, for example, sodium hydroxide, potassium hydroxide, lithium hydroxide, sodium carbonate, potassium carbonate, lithium carbonate, sodium bicarbonate, potassium bicarbonate, lithium bicarbonate, sodium phosphate, potassium phosphate, sodium hydrogen phosphate, potassium hydrogen phosphate, combinations thereof and the like. The basic-acting compound can be employed in solid form or as an aqueous solution, preferably as an aqueous solution in a concentration of from about 10 to about 70, suitably from about 25 to about 65, more suitably from about 40 to about 60, most suitably from about 45 to about 55 percent alkali metal hydroxide by weight. The amount of alkali metal hydroxide employed is from about 0.25 to about 10, suitably from about 0.5 to about 4, more suitably from about 0.65 to about 3, most suitably from about 0.8 to about 2 equivalents of basic-acting compound per equivalent of undesirable halide contained in the epoxy resin.

The heating can be conducted at atmospheric or superatmospheric pressure. When relatively low boiling solvents are employed, superatmospheric pressure is usually required. It is preferred to employ a temperature of from about 60° C. up to 150° C., more preferably from about 80° to about 130° C. It is preferable to not employ a temperature above the boiling point of the solvent system. For low boiling solvent systems, pressure can be employed so that temperatures above the boiling point can be employed.

When washing the epoxy resin to remove the salt formed and any unreacted alkali metal hydroxide, it is preferred to employ a plurality of washing steps employing as the first wash a dilute solution of an inorganic acid or a dilute solution of an inorganic acid salt, preferably acids or acid salts having a pKa value of from about 2 to about 10, preferably from about 2 to about 7.

Suitable acids and acid salts include, for example, phosphoric acid, mono-sodium phosphate, disodium phosphate, carbonic acid, boric acid, mixtures thereof and the like.

The epoxy resin is ultimately recovered by subjecting the organic phase from the washing procedure to distillation to remove the solvents from the epoxy resin.

The following examples are illustrative of the present invention, but are not to be construed as to limiting the scope thereof in any manner.

EXAMPLES 1-4 and COMPARATIVE EXPERIMENTS A-C 80 g of a cresol-formaldehyde epoxy novolac resin having an average epoxide equivalent weight (EEW) as indicated, an average epoxide functionality as indicated and containing the indicated amounts of chloride is dissolved in 100 g of a 50/50 by weight mixture of methyl ethyl ketone (MEK) and toluene. Varying amounts of dimethylsulfoxide (polar aprotic solvent) is added to the solution and the solution is heated to reflux (90° C.) with stirring. Varying amounts of 45% aqueous potassium hydroxide (1.8 eq. KOH to 1 eq. of total chloride) is added all at once and the reaction mixture is maintained at 90° C. for 3 hours (7200 s) with good agitation.

The reaction mixture is diluted to 20% resin concentration with MEK/toluene solvent mix, neutralized with dilute $CO_2$ and then washed with water 3 to 4 times to remove KCl.

The organic phase from the water washes is placed on a rotary evaporator under a full vacuum and 170° C. to remove the solvent completely. A purified cresol epoxy novolac resin with a total chloride content of 214 ppm and an EEW of 197 is obtained.

The following table I provides the results from the above treatment.

TABLE I

| | Ex. 1 | Ex. 2 | Comp. Expt. A* | Ex. 3 | Comp. Expt. B* | Ex. 4 | Comp. Expt. C* |
|---|---|---|---|---|---|---|---|
| CEN[1], g | 80 | 80 | 80 | 80 | 80 | 80 | 80 |
| EEW | 185 | 186 | 187 | 185 | 187 | 187 | 188 |
| Avg. Funct. | 6 | 6 | 6 | 6 | 6 | 6 | 6 |
| MEK/Tol[2], g | 100 | 100 | 100 | 100 | 100 | 100 | 100 |
| DMSO[3], g | 10 | 10 | 0 | 10 | 0 | 5 | 0 |
| 45% KOH, g | 0.4134 | 0.3756 | 0.3100 | 0.471 | 0.4180 | 0.5888 | 0.5847 |
| Eq/Eq. Cl | 1.8 | 1.8 | 1.6 | 2.0 | 2.0 | 3.0 | 3.0 |
| Bound Cl | | | | | | | |
| Initial[4], ppm | 695 | 691 | 644 | 692 | 641 | 662 | 639 |
| Final, ppm | 206 | 285 | 442 | 276 | 383 | 266 | 427 |
| Hydrolyz[5] Cl | | | | | | | |
| Initial[4], ppm | 99 | 50 | 66 | 146 | 90 | 35 | 53 |
| Final, ppm | 8 | <10 | 17 | 3 | 21 | 10 | 8 |
| Total Cl | | | | | | | |
| Initial[4], ppm | 794 | 741 | 710 | 838 | 731 | 697 | 692 |

TABLE I-continued

|  | Ex. 1 | Ex. 2 | Comp. Expt. A* | Ex. 3 | Comp. Expt. B* | Ex. 4 | Comp. Expt. C* |
|---|---|---|---|---|---|---|---|
| Final, ppm | 214 | 295 | 459 | 279 | 404 | 276 | 435 |

*Not an example of the Present invention.
[1]Cresol epoxy novolac resin.
[2]50% methyl ethyl ketone/50% toluene by weight.
[3]Dimethylsulfoxide.
[4]The initial chloride content for the various examples and comparative experiments is different because different lots of CEN were employed.
[5]Hydrolyzable chloride.

We claim:

1. In a method for reducing the undesirable halide content of an epoxy resin containing hydrolyzable halide and/or bound halide which method consists essentially of heating said epoxy resin which has been dissolved in a solvent system containing a ketone, an aromatic hydrocarbon, or any combination thereof in the presence of a basic-acting compound at a temperature and for a time sufficient to reduce the total aliphatic halide content of said epoxy resin and thereafter recovering the resultant epoxy resin; the improvement which comprises employing as an additional solvent an organic polar aprotic solvent different from the aforementioned ketone or aromatic hydrocarbon in an amount of from about 2 to about 80 percent by weight of the total amount of solvent employed.

2. A method of claim 1 wherein
  (a) the basic-acting compound is employed as a 10 to about 70 percent by weight aqueous solution in an amount of from about 0.25 to about 10 equivalents of basic-acting compound per equivalent of undesirable halide present in the epoxy resin being treated;
  (b) the solvent system contains from about 2 to about 80 percent by weight of polar aprotic solvent, from about 20 to about 49 percent by weight of ketone, from about 20 to about 49 percent by weight of aromatic hydrocarbon; and
  (c) the solvent system is employed in an amount of from about 25 to about 500 percent by weight of the epoxy resin being treated.

3. A method of claim 2 wherein
  (a) the basic-acting compound is employed as a 25 to about 65 percent by weight aqueous solution in an amount of from about 0.5 to about 4 equivalents of basic-acting compound per equivalent of undesirable halide present in the epoxy resin being treated;
  (b) the solvent system contains from about 4 to about 40 percent by weight of polar aprotic solvent, from about 30 to about 48 percent by weight of ketone, from about 30 to about 48 percent by weight of aromatic hydrocarbon; and
  (c) the solvent system is employed in an amount of from about 50 to about 250 percent by weight of the epoxy resin being treated.

4. A method of claim 3 wherein
  (a) the basic-acting compound is employed as a 40 to about 60 percent by weight aqueous solution in an amount of from about 0.65 to about 3 equivalents of basic-acting compound per equivalent of undesirable halide present in the epoxy resin being treated;
  (b) the solvent system contains from about 6 to about 20 percent by weight of polar aprotic solvent, from about 35 to about 47 percent by weight of ketone, from about 35 to about 47 percent by weight of aromatic hydrocarbon; and
  (c) the solvent system is employed in an amount of from about 75 to about 200 percent by weight of the epoxy resin being treated.

5. A method of claim 1 wherein
  (a) the basic-acting compound is potassium hydroxide, lithium hydroxide, sodium carbonate, potassium carbonate, lithium carbonate, sodium bicarbonate, potassium bicarbonate, sodium phosphate, postassium phosphate or any combination thereof;
  (b) the polar aprotic solvent is dimethyl sulfoxide, dimethyl acetamide, N-methylpyrrolidinone, dimethyl formamide, dimethylsulfone, tetramethyl urea, hexamethyl phosphoramide, tetramethylenesulfone, 1,4-dioxane, 1,2-dimethoxy ethane, 1,2-diethoxy ethane, 1,2-dimethoxy propane, or any combination thereof;
  (c) the ketone is methyl ethyl ketone, methyl isobutyl ketone, or a combination thereof;
  (d) the aromatic hydrocarbon is toluene, xylene or a combination thereof; and
  (e) the epoxy resin is a glycidyl ether of a bisphenol, a glycidyl ether of a phenol-formaldehyde novolac resin, a glycidyl ether of a cresol-formaldehyde novolac resin or any combination thereof.

6. A method of claim 2 wherein
  (a) the alkali metal hydroxide is potassium hydroxide, sodium hydroxide, lithium hydroxide or any combination thereof;
  (b) the polar aprotic solvent is dimethyl sulfoxide;
  (c) the ketone is methyl ethyl ketone; methyl isobutyl ketone or a combination thereof;
  (d) the aromatic hydrocarbon is toluene, xylene or a mixture thereof; and
  (e) the epoxy resin is a glycidyl ether of a bisphenol, a glycidyl ether of a phenolformaldehyde novolac resin, a glycidyl ether of a cresol-formaldehyde novolac resin or any combination thereof.

7. A method of claim 3 wherein
  (a) the alkali metal hydroxide is potassium hydroxide, sodium hydroxide or any combination thereof;
  (b) the polar aprotic solvent is dimethyl sulfoxide;
  (c) the ketone is methyl ethyl ketone;
  (d) the aromatic hydrocarbon is toluene, xylene or a mixture thereof; and
  (e) the epoxy resin is a glycidyl ether of a bisphenol, a glycidyl ether of a phenol-formaldehyde novolac resin, a glycidyl ether of a cresol-formaldehyde novolac resin or any combination thereof.

8. A method of claim 4 wherein
  (a) the alkali metal hydroxide is potassium hydroxide;
  (b) the polar aprotic solvent is dimethyl sulfoxide;
  (c) the ketone is methyl ethyl ketone;
  (d) the aromatic hydrocarbon is toluene, xylene or a mixture thereof; and
  (e) the epoxy resin is a glycidyl ether of a bisphenol, a glycidyl ether of a phenol-formaldehyde novolac resin, a glycidyl ether of a cresol-formaldehyde novolac resin or any combination thereof.

9. A process for reducing the total undesirable halide content of an epoxy resin containing hydrolyzable and/or bound halide which process consists essentially of
   (A) dissolving said epoxy resin in a solvent system which comprises
      (1) from about 2 to about 80 percent by weight of at least one organic polar aprotic solvent which is neither a ketone nor an aromatic hydrocarbon;
      (2) from about 20 to about 49 percent by weight of at least one ketone; and
      (3) from about 20 to about 49 percent by weight of at least one aromatic hydrocarbon; and;
   (B) heating the resultant solution to a temperature of from about 60° C. up to about 150° C.;
   (C) adding from about 0.25 to about 10 moles of a 10% to about 70% aqueous solution of an alkali metal hydroxide per equivalent of total halide;
   (D) continuing the heating for a time sufficient to reduce the total halide content of said epoxy resin;
   (E) washing the product from step (D) with either water, a dilute aqueous solution of a weak inorganic acid, acid salt or a combination thereof; and
   (F) recovering the resultant epoxy resin having a reduced total halide content from the product of step (E).

10. A process of claim 9 wherein
    (a) the solvent system employed in step (A) contains
       (1) from about 4 to about 40 percent by weight of at least one polar aprotic solvent;
       (2) from about 30 to about 47 percent by weight of at least one ketone; and
       (3) from about 30 to about 47 percent by weight of at least one aromatic hydrocarbon;
    (b) the temperature employed in step (B) is from about 80° C. to about 130° C.; and
    (c) from about 0.5 to about 4 moles of a 25% to about 65% aqueous solution of an alkali metal hydroxide is employed in step (C).

11. A process of claim 10 wherein
    (a) the solvent system employed in step (A) contains
       (1) from about 6 to about 20 percent by weight of at least one polar aprotic solvent;
       (2) from about 35 to about 47 percent by weight of at least one ketone; and
       (3) from about 35 to about 47 percent by weight of at least one aromatic hydrocarbon; and (b) from about 0.65 to about 3 moles of a 40% to about 60% aqueous solution of an alkali metal hydroxide is employed in step (C).

12. A process of claim 11 wherein
    (a) the solvent system employed in step (A) contains
       (1) from about 8 to about 10 percent by weight of at least one polar aprotic solvent;
       (2) from about 40 to about 46 percent by weight of at least one ketone; and
       (3) from about 40 to about 46 percent by weight of at least one aromatic hydrocarbon; and
    (b) from about 0.8 to about 2 moles of a 45% to about 55% aqueous solution of an alkali metal hydroxide is employed in step (C).

13. A process of claim 9 wherein
    (a) the alkali metal hydroxide is potassium hydroxide, sodium hydroxide, lithium hydroxide or any combination thereof;
    (b) the polar aprotic solvent is dimethyl sulfoxide;
    (c) the ketone is methyl ethyl ketone, methyl isobutyl ketone or a combination thereof; and
    (d) the aromatic hydrocarbon is toluene, xylene or a mixture thereof.

14. A process of claim 10 wherein
    (a) the alkali metal hydroxide is potassium hydroxide, sodium hydroxide or a combination thereof;
    (b) the polar aprotic solvent is dimethyl sulfoxide;
    (c) the ketone is methyl ethyl ketone, methyl isobutyl ketone or a combination thereof; and
    (d) the aromatic hydrocarbon is toluene, xylene or a mixture thereof.

15. A process of claim 11 wherein
    (a) the alkali metal hydroxide is potassium hydroxide, sodium hydroxide or a combination thereof;
    (b) the polar aprotic solvent is dimethyl sulfoxide;
    (c) the ketone is methyl ethyl ketone, methyl isobutyl ketone or a combination thereof; and
    (d) the aromatic hydrocarbon is toluene, xylene or a mixture thereof.

16. A process of claim 12 wherein
    (a) the alkali metal hydroxide is potassium hydroxide, sodium hydroxide or a combination thereof;
    (b) the polar aprotic solvent is dimethyl sulfoxide;
    (c) the ketone is methyl ethyl ketone, methyl isobutyl ketone or a combination thereof; and
    (d) the aromatic hydrocarbon is toluene, xylene or a mixture thereof.

* * * * *